US006811402B1

(12) United States Patent
Ritchie

(10) Patent No.: US 6,811,402 B1
(45) Date of Patent: Nov. 2, 2004

(54) METHOD OF PLAYING A MATHEMATICAL GAME

(76) Inventor: Samuel English Ritchie, 1502 Stonewall Rd., Alexandria, VA (US) 22302

( * ) Notice: Subject to any disclaimer, the term of this patent is extended or adjusted under 35 U.S.C. 154(b) by 0 days.

(21) Appl. No.: 10/438,319

(22) Filed: May 15, 2003

(51) Int. Cl.$^7$ .............................. A63F 9/04; G09B 19/22
(52) U.S. Cl. ...................... 434/191; 434/188; 434/208; 434/209; 434/128; 273/146; 273/272
(58) Field of Search ................................ 434/188–216, 434/128; 273/272

(56) References Cited

U.S. PATENT DOCUMENTS

| | | | | |
|---|---|---|---|---|
| 3,314,168 A | * | 4/1967 | Heckman | 434/208 |
| 3,959,893 A | * | 6/1976 | Sigg | 434/208 |
| 4,379,700 A | * | 4/1983 | Pollock | 434/208 |
| 4,452,588 A | * | 6/1984 | Smith | 434/207 |
| 5,176,381 A | * | 1/1993 | Winters | 273/146 |
| 5,338,203 A | * | 8/1994 | Rheams | 434/208 |
| 5,560,611 A | * | 10/1996 | Kim | 273/272 |
| 5,827,067 A | * | 10/1998 | Perez | 434/208 |
| 6,341,779 B1 | * | 1/2002 | Merritt | 273/292 |

* cited by examiner

Primary Examiner—Derris H. Banks
Assistant Examiner—Dmitry Suhol

(57) ABSTRACT

A method of playing a mathematical game to calculate a target value includes generating the target value randomly, generating a plurality of calculating numbers to be used to calculate the target value, and calculating, by a first player, an initial solution that is equal to the target value, by combining the calculating numbers with any combination of a plurality of mathematical operations in any order. The calculating numbers can also be generated randomly and the plurality of mathematical operations includes addition, subtraction, multiplication, division, powers and roots. If the first player fails to attain the initial solution equal to the target value, then an alternate solution is attained by the first player that approximates the target value. The second player then uses the same previously generated calculating numbers, with a second different combination of the plurality of mathematical operations in any order, to calculate a second solution that is equal to the target value, or more closely approximates the target value than the first player. The game continues until the target value is attained, or a final value is attained that most closely approximates the target value.

17 Claims, 2 Drawing Sheets

METHOD OF PLAYING A MATHEMATICAL GAME

BACKGROUND OF THE INVENTION

1. Field of the Invention

The invention is broadly directed to games, and more specifically to educational games or games of skill used by one or more players for enjoyment and instructional purposes.

2. Description of the Related Art

There exist a large variety of game categories including card games, board games, multi-player games, single-player games, arcade games, computer games, and the like. A popular game category is educational games, which have a dual purpose of teaching a particular skill while providing enjoyment and competition for the user/player.

Educational games cover a wide variety of subjects, including math, science, language, history, and reading. For example, in a version of a popular mathematical game, the players are presented with four numbers. Using the mathematical operations of addition, subtraction, multiplication and division, the four numbers must be combined to equal a target value of 24. The 24® game is adept at teaching certain patterns related to the mathematical operations leading to a target value of 24, because the players know that the ultimate result will always be 24. There are multiple versions of the 24® game with various skill levels, with different versions of the game emphasizing different mathematical operations, different target numbers, or using fractions instead of integers.

Other math games, such as 1-2-3 OY! and 13 Dice, provide a degree of randomness with regard to how the initial target number is determined, either through using a deck of numbered cards, or rolling one or more numbered dice.

For each of the above games, the objective is the same. Combine a base set of numbers and a sequence of mathematical operations to attain the target value. In some cases, the base set of numbers is pre-selected to ensure there is at least one mathematical solution to every round. In other cases, if the target value cannot be reached, a new target value is selected and the game continues.

The above games and others of this genre emphasize finding the right answer (i.e., the target value), or determining that the target value cannot be reached. These games all provide valuable skill development in mathematical operations, number patterns, and mental math calculations.

However, there exists a need for a mathematical game that introduces a third aspect or level of complexity into the fabric of the game, namely, the need to look for the closest solution to a target number, in addition to the possibilities of attaining or not attaining the target number.

SUMMARY OF THE INVENTION

The present invention is directed to an educational game, and an object of the invention is to teach math computational skills, or mental math, in a way that is fun and competitive.

It is another object of the present invention to create unpredictability or randomness in the target value, the calculating numbers used to achieve the target value, or both, to further enhance math computational skills.

It is still another object of the present invention to create an environment where a particular randomly selected target value is unattainable, but a winner is determined by achieving a value that most closely approximates the random target value.

To achieve these and other objects, the present invention provides for a method of playing a mathematical game to calculate a target value. The method broadly includes (i) generating the target value randomly, (ii) generating a plurality of calculating numbers to be used to calculate the target value, and (iii) calculating, by a first player, an initial solution that is equal to the target value, by combining the calculating numbers with any combination of a plurality of mathematical operations in accordance with order of operations rules.

If the calculating step fails to attain the initial solution equal to the target value, then an alternate solution is attained by the first player that approximates the target value. The second player then uses the previously generated calculating numbers, with a second different combination of the plurality of mathematical operations, to calculate a second solution that is equal to the target value, or more closely approximates the target value than the first player. The game continues until the target value is attained, or a final value is attained that most closely approximates the target value. Alternatively, the game could end based on the expiration of a predetermined time period.

The calculating numbers also can be generated randomly, and the plurality of mathematical operations includes addition, subtraction, multiplication, division, powers and roots. In addition, the target value and calculating numbers could be drawn from the rational numbers, examples of which include whole numbers, mixed numbers, negative numbers, and fractions.

The target value, although still randomly generated, may be restricted to a pre-defined range of values to facilitate training exercises in patterns associated with one or more of the mathematical operations. By scoring the training exercises, one can quantify a proficiency level value in mathematical computational skills for each player in a tournament. The competing players in a tournament can be grouped according to the same or different proficiency level values.

BRIEF DESCRIPTION OF THE DRAWINGS

The above objects and other advantages of the present invention will become more apparent by describing in detail the preferred embodiments thereof with reference to the attached drawings in which.

DETAILED DESCRIPTION OF PREFERRED EMBODIMENTS

The present invention will now be described more fully with reference to the accompanying drawings, in which preferred embodiments of the invention are shown. The invention may, however, be embodied in many different forms and should not be construed as being limited to the embodiments set forth herein. Rather, the embodiments are provided so that this disclosure will be thorough and complete, and will fully convey the concept of the invention to those skilled in the art.

Broadly described, the present invention relates to a mathematical game designed to teach math computational skills, or mental math, in a way that is fun and competitive. Computational skills refers to the basic mathematical operations of addition, subtraction, multiplication, division, powers and roots.

This is achieved by creating unpredictability or randomness in the target value as well as the calculating numbers used to achieve the target value. In addition, another aspect or level of complexity is added to the fabric of this inventive game, namely, that a winner can be declared by achieving the closest solution to a target number, when the target number is unattainable.

Players will also become acquainted with "order of operations" rules, since some of the calculations will follow normative order of operations rules and in other cases players will need to overrule these rules in order to achieve their intended result.

By way of brief background, "order of operations" refers to a standard set of rules that defines the order in which you should simplify different operations such as addition, subtraction, multiplication and division. The order of operations is shown below.

1. Parenthesis and Brackets—Simplify the inside of parenthesis and brackets before you deal with the exponent (if any) of the parenthesis or remove the parenthesis.
2. Exponents—Simplify the exponent of a number or of a parenthesis before you multiply, divide, add, or subtract it.
3. Multiplication and Division—Simplify multiplication and division in the order they appear from left to right.
4. Addition and Subtraction—Simplify addition and subtraction in the order they appear from left to right.

Figure 1:
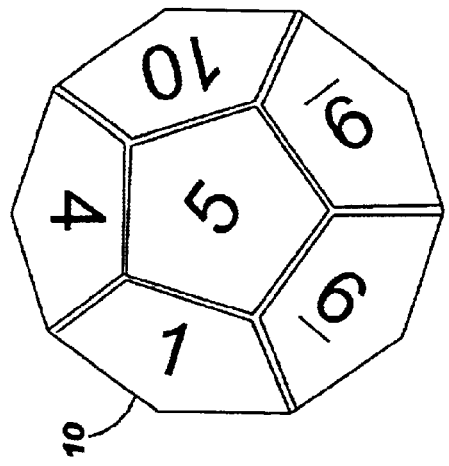
FIG. 1 is a perspective view of two twelve-sided dice that may be employed in an embodiment of the invention to generate a random target value.
Figure 1:
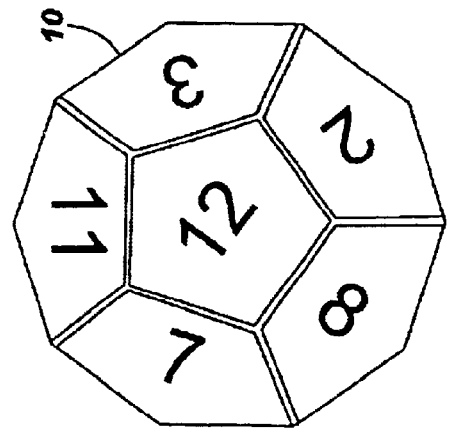
Figure 2:
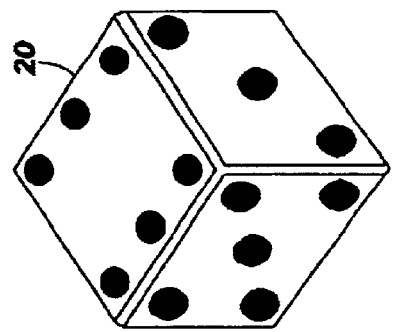
FIG. 2 is a perspective view of three typical six-sided dice that may be employed in an embodiment of the invention to generate a plurality of calculating numbers randomly.
Figure 2:
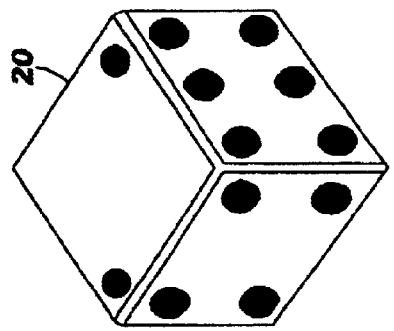
Figure 2:
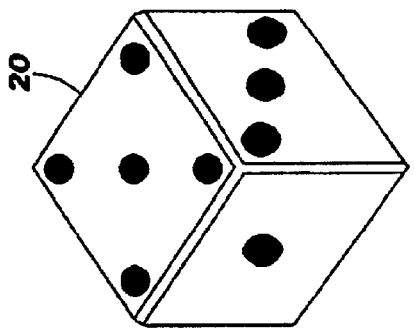

In a preferred embodiment, the game is played with five dice, including two twelve-sided dice—the target value dice 10 as shown in FIG. 1—and three regular six-sided dice—the calculating number 20 or shooter dice as shown in FIG. 2. Two players, or two teams, compete with each other. The game could also be played alone for practice.

Each roll of the dice is considered a turn; by winning a turn, a player wins a point. While one of ordinary skill in the art would appreciate that there are numerous variations in scoring to determine a winner, for this description we will assume that to win a game the player must be the first to win three points.

On each turn, players begin by rolling the two twelve-sided dice and multiplying together the numbers showing on the top faces of the dice. The resulting random number, which will fall into a range from 1 to 144, is declared to be the target value. Once the target value has been determined, one of the players rolls the three calculating number or shooter dice, which results in three random numbers, each of which ranges from 1 to 6.

The game consists of the players combining the three shooter numbers together, using any combination of the six mathematical operations listed above in any order they wish, as governed by the order of operations rules for mathematical operations, to calculate a solution which equals the target value, or comes as close as they can to the target value. Each of the three shooter numbers must be used once and only once. The player who achieves the target value first is the winner of that turn.

In the present invention, given the randomness in both the target value and the calculating numbers, there is no certainty that players can exactly reach the target value on a given turn. For example, in an extreme case, the target value could be 144 and the shooter numbers can be 1, 1, and 1. In such a case, the player who is able to come closest to the target value is the winner of the turn. The obvious highest answer is 3, the sum of 1+1+1. Other examples are provided below for illustrative purposes.

In the typical two-person game (played in-person or online over a computer network with another player for example), after the shooter dice are rolled, the players examine the dice, make calculations in their head, and then when they are ready, call out a solution that they believe is equal to, or the closest possible to the target value. Once a player has called out an answer, the second player has a predetermined time period, fifteen seconds for example, to try to achieve an alternate solution that is equal to, or closer to the target value than the first player. If the second player successfully finds a closer solution, the first player has an additional predetermined time period (e.g., 15 seconds) to find a solution that is equal to, or closer to the target value than the second player. The play continues in this fashion until a player finds a solution equal to the target value, or a final solution that most closely approximate the target value. Alternatively, the turns may be limited to a certain designated number for each player, or all turns may need to be completed within a predetermined overall time period for the round.

If more than two players (or two teams) are participating in a round, each player/team could taking a turn in sequence, or alternatively call out a result when an appropriate closer or target value solution is identified.

Additional rules may optionally be enforced for each game. For example, the rules may require that once a player has called out a solution, they are not allowed to improve their answer until the second player has declared a solution that is closer than the previous call. Also, if either player can hit the target value exactly, they are the winner; and if both players are equally far from the target value, but one is lower and the other is higher, the player with the lower result is the winner of the turn. In addition, in order to gain a point, the winner must state what equation they used and have it approved by their opponent. Also, the rules associated with the timing for each calculating step may be altered depending on the skill levels of the respective players, or the objective of the teaching method.

Figure 3:
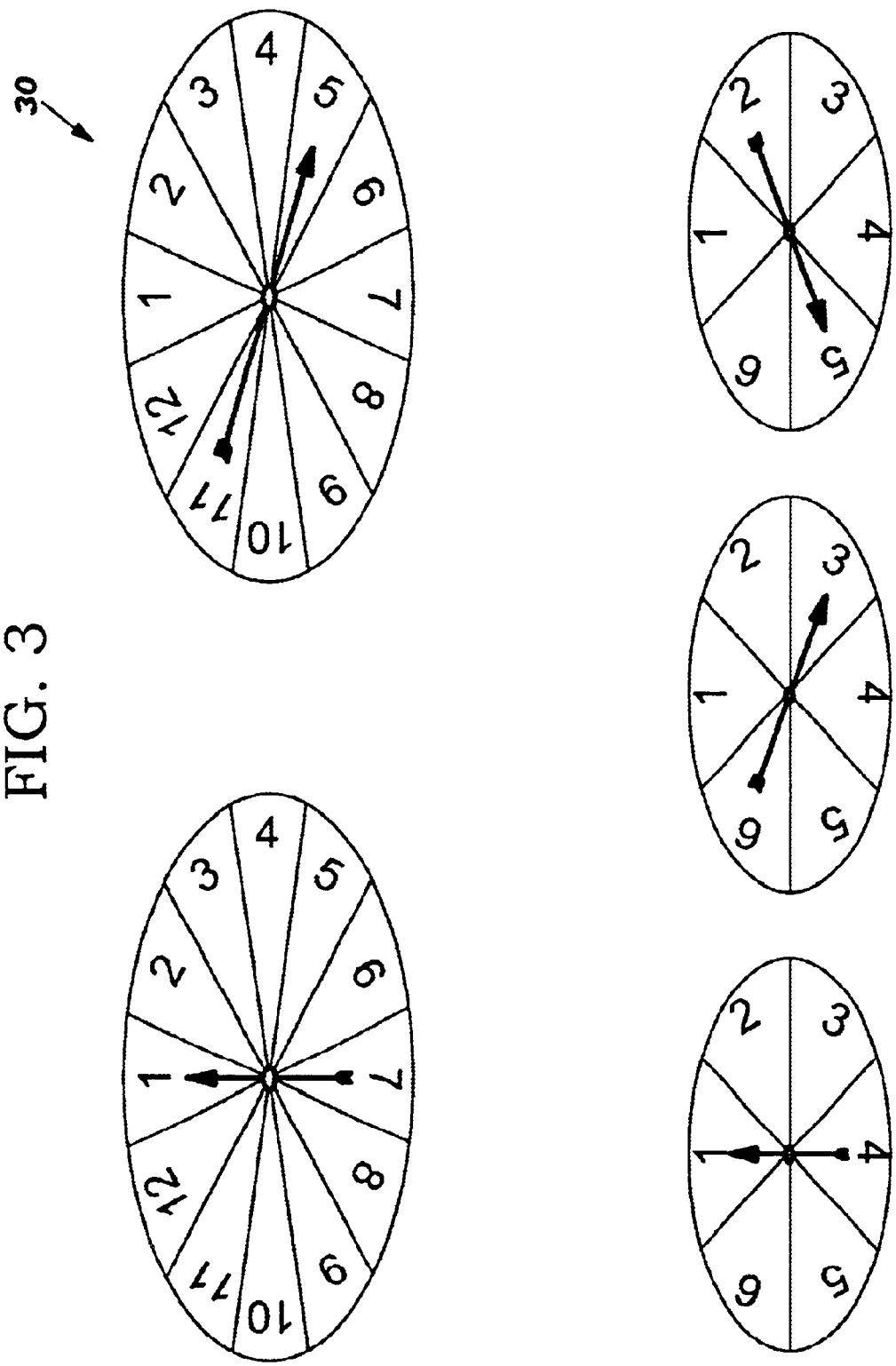
FIG. 3 is a perspective view of an alternate device that may be employed in an embodiment of the invention to generate a target value or a plurality of calculating numbers randomly.

Note that instead of dice, other equivalent means of generating a random target value may be employed, including conventional spinners 30 as shown in FIG. 3, or alternatively, a deck of consecutively numbered cards, the second hand of a clock as it passes a particular value at the commencement of each round, or in the case of an online or computerized game, a simple random number generator program. No matter how attained and with what means, the key is the target value has the potential to be different for every round.

The present invention achieves several unique and synergistic features as hereafter described. The rolling of the target value dice of FIG. 1 (or other means of FIG. 3) provides a different, randomly selected target value that players are trying to reach for each round. This variability is an important contributor to the educational value of the game for several reasons.

First, having the target value changing from low to high to medium ensures that different mathematical operations are emphasized from round-to-round, so players have to continually assess which mathematical operations to use and in what order to use them.

Second, the variability and randomness ensures that there is never a guarantee that the shooter numbers can be combined in any way to exactly calculate the target value. Because of this, players have an incentive to work through a wider range of calculations in their head, actively looking for combinations that may or may not be close to the target, holding and sorting their results in their head while evaluating whether they are close enough to win the turn.

Third, because of the game rule which allows the players to continue to search for a better result after their opponents have declared an answer, both players are encouraged to continue to scour through the numbers and continue making calculations and looking for patterns on each turn where they have not found an answer that attains the target value directly.

The use of the six major mathematical operators—including powers and roots—along with the rule that each shooter number must be used once and only once, provides players with a dramatic demonstration of the flexibility and fluidity that can be achieved with single digit numbers. As a simple example, note that the shooter numbers 1, 2, 3 can be combined to achieve targets of 1, 2, 3, 4, 5, 6, 7, 8, 9 and 10, and can hit a target value as high as 27—(3^(2+1)). The flexibility and fluidity can begin to be appreciated by playing several rounds of the game; and it can be appreciated more after playing several rounds against an experienced opponent who is practiced in the game and experienced in making some of the subtler calculations. The true educational value comes into play once a player realizes that in order to win the game, they need to gain a proficiency in understanding how and when to use powers, to employ division to manufacture a number that can be multiplied with another number to get close to a target, and when to create a fraction to get marginally closer to the target than has their opponent.

Especially under the guidance of teachers, the game helps players gain a proficiency in fractions, mixed numbers and irrational numbers, as well as whole numbers. As an illustration, consider the example where the target value is 8, with shooter numbers of 4, 5 and 6. It is possible to achieve a result of 7 or 10, but the integers 8 or 9 can not be calculated with these shooter numbers under the rules of the game. If Player 1 declares an answer of "7", consider the possible improvements available to Player 2:

Player 1: (5+6)−4=7
Player 2: (5/4)+6=7.25
Or (6/4)*5=7.5
Or (6/4)^5 is about 7.6
Or (6 root 4)*5 is about 7.825
Or (4 root 5)*6 is about 7.92

It is understood that a smart but not extraordinary player would be unlikely to come up with the final three equations, but there is a good chance that an experienced player could reach 7.25 or 7.5 on their own. But a teacher, using a supplied table of all possible results, would be able to demonstrate how much is possible once players learn to search for, calculate and estimate using roots and powers applied to fractions and other desirable and more advanced techniques.

Other game examples are provided in the table below for illustrative purposes.

TABLE 1

Exemplary Rounds of the Math Game

| Round 1 | Round 2 | Round 3 |
|---|---|---|
| Target Value: 2 | Target Value: 27 | Target Value: 7 |
| Calculating Numbers: | Calculating Numbers: | Calculating Numbers: |
| 2,3,5 | 2,4,5 | 2,5,6 |
| Player 1: (2 ^ 3) − 5 = 3 | Player 1: (2 ^ 4) + 5 = 21 | Player 1: (2 * 5) − 6 = 4 |
| Player 2: (2 + 3)/5 = 1 | Player 2: (4/2) ^ 5 = 32 | Player 2: (5 − 2) + 6 = 9 |
| Player 1: (3/5) * 2 = 1.2 | Player 1: (4 * 5) + 2 = 22 | Player 1: (5 + 6) − 2 = 9 |
| Player 2: (3/5) + 2 = 2.6 | Player 2: (2 + 4) * 5 = 30 | Player 2: 5 + (2/6) = 5.333 |
| Player 1: 2 − (3/5) = 1.4 | Player 1: (5 ^ 2) + 4 = 29 | Player 1: 6 + (5/2) = 8.5 |
| Player 2: (2 ^ 3)/5 = 1.6 | Player 2: 5 ^ (4/2) = 25 | Player 2: (5 + 6)/2 = 5.5 |
| Player 1: (2 + 5)/3 = 2.333 | Player 1: (2 ^ 5) − 4 = 28 | Player 1: (6/2) + 5 = 8 |
| Player 2: (3 ^ 2)/5 = 1.8 | | Player 2: 6 + (2/5) = 6.4 |
| Player 1: (2 * 5)root 3 = 2.154 | | Player 1: (6 ^ 2)/5 = 7.2 |
| Player 2: (2 + 5)root 3 = 1.913 | | Player 2: (6 * 2) − 5 = 7 |

Because of its mathematical versatility and educational character, the game lends itself to explicit educational training as well as simple competitive fun. For example, by querying a database containing all possible combinations of results for integer value shooter numbers ranging from (−12) to 12, one is able to draw from this database various groupings of specific challenge problems that offer training in particular mathematical operations and other focus areas. These can be published on paper and offered to players as "training exercises" in a form that closely resemble traditional homework drill problems, only more targeted in what they teach and more desirable to the players because they are helping to build skills and mental muscles, similar to sports practice.

Therefore, while still randomly generated, the target values could be limited to a pre-defined range to achieve a desired teaching objective. As examples, consider the following focus areas that could be realized by database queries:

Target values that can be achieved using addition only (for beginner players not comfortable with basic mathematical operations)

Target values that require subtraction to be used to achieve the specified result Target values that require a combination of addition and multiplication Target values where the target number is a fraction or mixed number, requiring that division be used Target values where the target number is a negative number Target values where a specific number must be used as a power in order to correctly reach the target number, such as five to some power plus an additional number.

An experienced teacher or coach can work with the students to focus on specific skill areas towards the upper boundaries of their own ability levels. Because the player (student) will understand that they need to be looking for a specific operation or set of operations when presented with specific problem sets, it will allow players to get more experience and gain deeper recognition of a variety of operations and number patterns.

The present inventive game is also ideal for multi-player or multi-team tournaments. Normal tournament rules can be applied, including multiple rounds, single-elimination or double-elimination, time constraints, and other conventional tournament methods.

However, the ability to create training exercises from the data and database queries described above, also creates a unique ability to seed players in the tournament according to a level of proficiency in math computational skills.

The seeding process could begin by providing specific training exercises before a tournament. Then, by scoring or grading the training exercises, one could develop a range of proficiency level values from high to low, for example 1–100, corresponding to a player's math computational proficiency. Groupings in the tournament could be made to ensure that players compete with other players having an equivalent proficiency level value, for example, values between 60–65. Alternatively, groupings in the tournament could be made to ensure that players with relatively higher proficiency level values, greater than 90 for example, meet in the later rounds of the tournament. Of course, various methods of scoring, ranges of scoring, and methods of seeding are contemplated within the scope of this invention, and could be readily ascertained by one of ordinary skill in the art.

The preferred embodiment described above employed commercially available dice to attain the random target value and shooter numbers. Alternative means of generating a random target value and random shooter numbers was also described above. In addition, one or ordinary skill in the art would appreciate that there are numerous alternative means for customizing the game as well.

For example, the game may employ customized dice specially designed for particular challenge levels and to emphasize the use of specific skills, such as the pre-defined target values as described above. Customization not only adds variety and richness to the playing experience, it alters the competitive landscape to give the game an enduring appeal once players have built expertise with the standard game version. In addition, it enhances the educational value of the game by offering a wider variety, and different types, of variables that players must contend with in their calculations.

Examples of how the game can be customized include:

(i) target value dice printed with fractions and mixed numbers as well as, or in place of integers, which would place an emphasis on the development of skills with handling division;

(ii) target value dice printed with negative numbers as well as, or instead of positive numbers (and including zero (0) as a target value), which would place an emphasis on subtraction, on understanding the relationship of positive and negative numbers, and on roots. Note that (−2) as well as 2 is a square root of 4, something not often taught in the lower educational grades;

(iii) target value dice printed with numbers specially calculated to encourage use of powers, such as "25", "27", "36", "49", "64", "81"—and the rule could be changed to add two target value dice, rather than multiply them, to achieve the target value number, which would emphasize players' facility with powers;

(iv) the shooter dice could contain combinations of positive and negative numbers, fractions, mixed numbers, and larger and smaller numbers in the same manner as the target value dice, to add versatility and expand the educational nature of the game.

In addition to adding sophistication and complexity, simpler versions of the game can be developed for beginner and less advanced players. This approach could include custom dice, and/or rules modifications, such as adding rather than multiplying the target value dice to contract the range of the target values from 1 to 24 (for two twelve-sided dice) or even use one die to contract the range to between 1 and 12. When the game is presented as a competitive, fun experience as well as an educational one, it gives the teacher the opportunity to offer a variety of challenges to match the player's skill levels with a specific rule set and dice set, and for the rules and numbers to flex and grow as does the player's proficiency.

Gaming continues to be a growing industry and there is always a need for new games that players will enjoy and will continue to play. It is important that any new game be easy to understand and that the game provided multiple opportunities to win. With multiple opportunities to win, a player will win frequently and thus will not become frustrated with the game and abandon it.

While the present invention has been described in detail with reference to the preferred embodiments thereof, it should be understood to those skilled in the art that various changes, substitutions and alterations can be made hereto without departing from the scope of the invention as defined by the appended claims.

What is claimed is:

1. A method of playing a mathematical game,
   providing a means for generating a target value randomly;
   generating a target value randomly;
   providing a means for generating a plurality of calculating numbers for use during each round of the mathematical game;
   generating a plurality of calculating numbers;
   calculating an initial solution by a first player that is equal to the target value, by combining the plurality of calculating numbers with an initial combination of a plurality of mathematical operations,
   wherein if the calculating step fails to attain the initial solution equal to the target value, then calculating an initial alternate solution that approximates the target value; and
   calculating a subsequent solution by a different player using the plurality of calculating numbers and a different combination of the plurality of mathematical operations, to attain a subsequent solution that is equal to the target value, or more closely approximates the target value than any prior solution.

2. The method of claim 1, wherein said calculating a subsequent solution step continues until the target value is attained, or a final value is attained that most closely approximates the target value, thereby completing the round of the mathematical game.

3. The method of claim 1, wherein said calculating a subsequent solution step continues until a predetermined overall time period expires, with a winner being a player who attained a solution that more closely approximates the target value than any other player when the overall time period expires.

4. The method of claim 1, wherein each of the calculating steps must be completed within a predetermined time period.

5. The method of claim 1, wherein said generating a plurality of calculating numbers comprises generating said calculating numbers randomly.

6. The method of claim 1, wherein the plurality of mathematical operations comprises addition, subtraction, multiplication, division, powers and roots.

7. The method of claim 6, wherein the plurality of mathematical operations may be combined in any order.

8. The method of claim 1, wherein said target value is randomly generated within a pre-defined range of values.

9. The method of claim 8, wherein the pre-defined range of values comprises values that facilitate training in patterns associated with one of the mathematical operations.

10. The method of claim 8, wherein the pre-defined range of values comprises values that facilitate training in patterns associated with a plurality of the mathematical operations.

11. The method of claim 10, wherein the target value and calculating numbers comprise rational numbers, including whole numbers, mixed numbers, negative numbers, and fractions, which facilitate training in patterns associated with the plurality of the mathematical operations.

12. The method of claim 1, wherein the target value and calculating numbers comprise rational numbers, including whole numbers, mixed numbers, negative numbers, and fractions.

13. The method of claim 1, further comprising grouping the players according to a level of proficiency in math computational skills.

14. The method of claim 13, further comprising generating practice sheets of mathematical problems, wherein the mathematical problems comprise a pre-defined range of target values that measure the level of proficiency in patterns associated with a mathematical operation, or a plurality of the mathematical operations; and scoring said practice sheets to produce a proficiency level value.

15. The method of claim 14, further comprising grouping the players according to equivalent proficiency level values.

16. The method of claim 14, further comprising grouping the players according to different proficiency level values.

17. The method of claim 16, further comprising seeding the players to ensure the players with relatively higher proficiency levels meet in later rounds of a multiple round elimination tournament.

\* \* \* \* \*